July 23, 1957  W. WOCKENFUSS  2,800,386
RECORDING DEVICE AND METHOD OF MANUFACTURE
Filed March 12, 1954
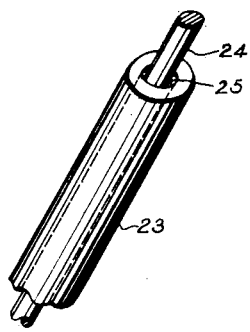
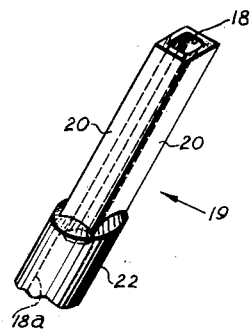
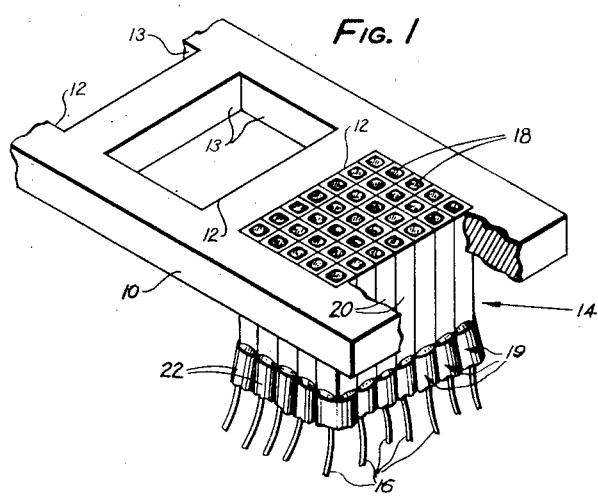
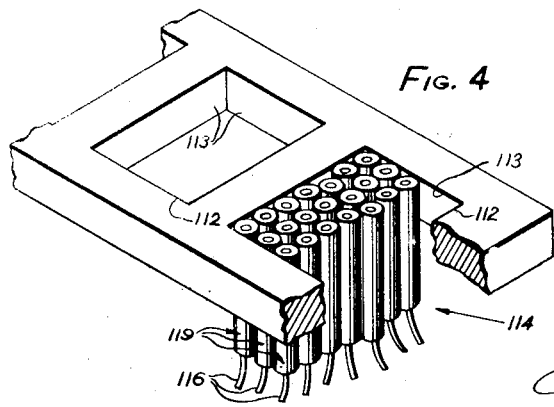
INVENTOR.
WILLIAM WOCKENFUSS
BY
ATTORNEY United States Patent Office 2,800,386
Patented July 23, 1957

2,800,386
RECORDING DEVICE AND METHOD OF MANUFACTURE

William Wockenfuss, Brooklyn, N. Y., assignor to Burroughs Corporation, Detroit, Mich., a corporation of Michigan Application March 12, 1954, Serial No. 415,736

2 Claims. (Cl. 346—141)

This invention relates to selectively operated, data-forming, recording machines, and particularly to improvements in the recording heads of such machines.

Recording machines of the aforesaid type generally have a plurality of recording heads aligned in a row or rows for recording information in a line or lines upon an impression receiving surface. Each recording head is composed of a mosaic of recording elements, usually wires, which may be selectively operated by an operating mechanism in the recording machine. Because of the small size of the wires, they are generally encased in guide members. The recording elements are arranged in rows and columns within the head. Recording of information or data is accomplished by selecting a combination of the recording elements in each of the recording heads in a manner such as to form, in each instance, a matrix of the respective character or symbol which is to be recorded.

It has been a common experience heretofore that in the attempt to lay the recording elements and their guides side by side in aligned rows, certain of the guides and recording elements would slip and roll upon each other, thereby becoming misaligned. The task of holding them in position while they are being arranged in rows and columns, until a complete head is formed, is a difficult one according to conventional practices.

A principal object of this invention is to provide an improved recording head which, by its manner of construction and assembly, inherently prevents misalignment of the recording elements and their guides, and which may be assembled more expeditiously, accurately and economically than the recording heads of the prior art.

Another important object of the present invention is to provide a recording head formed by a mosaic of assembled recording elements each of which is guided in a member having a configuration designed to prevent misalignment thereof with other similarly configured guide members during the assembly of the head.

Another object of the present invention is to provide each of the recording elements with a novel guide member which is so designed that when the recording elements are assembled in rows and columns to form a recording head, these guide members will aid in their mutual lateral support.

Still another object is to provide an improved method of making a recording head whereby the guide members for the recording elements are formed out of conventionally shaped stock but in a novel manner so as to eliminate the problem of misalignment which heretofore has been encountered during the assembly of the recording elements in the head.

In pursuance of the foregoing object, the invention teaches the formation of guide members from round tubular stock in such a way as to provide flat outer faces, thereby to permit quick, accurate assembly of the guide members and their enclosed recording elements in the mosaic of the recording head.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is an isometric view of the top portion of a recording head constructed in accordance with the principles of my invention, parts of the mounting head being broken away to illustrate more clearly the arrangement of the recording elements and their guides.

Fig. 2 is an enlarged isometric view of one of the recording elements and its associated guide shown in the recording head in Fig. 1.

Fig. 3 is an isometric view of the recording element guide before the same has been formed as shown in Fig. 2.

Fig. 4 is an isometric view of a recording head which has been partially assembled in accordance with the practice of the prior art.

Referring now to Fig. 1 which shows a recording head constructed in accordance with the principles of my invention, the mounting member 10, situated in the recording section of the machine, is provided with a plurality of openings 12 defined by the sides 13. Openings 12 are formed in a line. Recording heads, generally designated 14, are placed in the openings 12 to permit the recording of lines of information or data. In the drawings, the sides 13 which define the openings 12 are shown at right angles to each other. This, however, is not intended to be limiting since it will be clear, as the description proceeds, that the shape of the openings 12, as defined by its sides 13, may be varied.

The recording heads, one of which is generally designated by numeral 14 in Fig. 1, are assembled and confined at their upper ends within the openings 12, there being one recording head in each opening. Referring again to Fig. 1 it will be clear that since all the heads 14 are similar only one such head has been shown. The head 14 consists of a mosaic of recording elements 16, generally wires, which are arranged preferably with seven recording elements to a row and five rows wide. Here too, the number of the recording elements is not intended to be limited to that described. If desired, more recording elements 16 may be added to each row and more rows of recording elements may be added.

Each one of the recording elements 16 is selectively operated by an operating mechanism (not shown) in the recording machine. Examples of selectively operated, data-forming recording machines and recording element operating mechanisms, are disclosed in the U. S. Patent No. 2,648,277, issued on August 11, 1953, to William Wockenfuss and in the pending U. S. application of Frederick Q. Rast, Serial No. 118,063, filed September 27, 1949, now Patent No. 2,681,614, issued June 22, 1954. Such operating mechanisms may be employed to operate the recording elements 16 of the instant device. Inasmuch as the operating mechanism does not form any part of my invention, the structure of neither the machine nor the operating mechanism has been shown.

To insure accurate and unhampered operation of the recording elements 16, each one of them is guided in an opening 18 (Fig. 2) in an individual guide member or casing generally designated 19. Fig. 2 is an enlarged view of a guide member 19 shown in Fig. 1 without the associated recording element 16. Inasmuch as all the guides 19 are similar, the description of one will suffice for all. An end portion of the guide 19 is formed to provide a plurality of flat sides or faces 20 which merge with a cylindrical portion 22, the purpose of these flats being explained hereinafter. Although four sides 20 have been shown on the guide 19, it will be clear as the description proceeds that this number of sides may be varied.

A work piece 23 of cylindrical tubular stock is utilized to form the guide member 19, Fig. 2. The piece 23 has the same outer diameter as the cylindrical part 22 of the guide member 19. The hole 25 in the piece 23 likewise has the same diameter as the opening 18a in the cylindrical part 22. This opening 18a merges with the guide opening 18, which is of reduced cross section due to the formation of the flats 20 on the guide member 19. The opening 25 in the work piece 23 is sufficiently large so that it can be reduced by the forming process to afford a guide opening 18 in which a recording element 16 will have a good sliding fit.

As the first step in making a guide member 19, a forming member 24 (Fig. 3) having substantially the same shape and of slightly larger cross-sectional area than a recording element 16 is placed in a large diameter opening 25 of the piece 23. Pressure is then applied radially from several directions to the end portion of the piece 23 to form the sides 20 and to compress the material about the member 24 therein. This pressure may be applied in any well known manner, as for example by passing the piece 23 through a forming die. During the formation of the sides 20 a deformation of the piece 23 takes place. The piece 23 is elongated as the flats 20 are formed while at the same time, because of the application of pressure, the opening 25 in which the forming member 24 is placed will be narrowed in diameter as the surrounding material is forced by compression against the member 24. Removal of the member 24 from the formed member 19 (Fig. 2) leaves the desired opening 18, which is slightly oversized or larger in cross section than the recording element 16 (Fig. 1).

Before describing the manner in which the recording head is assembled in the present instance, mention will be made of how recording heads have been assembled in accordance with the practice of the prior art. In Fig. 4, wherein similar parts are similarly numbered with the addition of the prefix numeral "1," a recording head 114 is shown partially assembled. In the attempt to assemble the recording elements 116 and their individual cylindrical guides 119 side by side in aligned rows within the confines of the opening 112, certain of the guides 119 would slip and roll upon each other, producing misalignment of the recording elements or wires 116. This misalignment was the result of many factors such as the stiffness of the recording wires 116 and also the smallness and inaccessibility of the opening 112 in which the wires had to be placed. However, most important of all was the fact that neither the recording elements 116 nor their guides 119 had any means which would either aid in their alignment or aid in their mutual lateral support. This problem has now been eliminated by the novel guide member shown in Fig. 2 and described above.

In the assembly of the recording head as taught by my invention, the recording elements 16 are inserted in the openings 18 in the guide casings 19 (see Figs. 1 and 2). The casings 19 are arranged in aligned rows of a predetermined number and wedged between opposite sides 13 of the opening 12 of the mounting member 10. The aligned rows are then arranged adjacent to each other and wedged between the third and fourth sides 13 of the opening 12 until the recording head is completed. In the arrangement of the casings 19, and the recording elements 16, the flat sides of each one of the casings will touch and wedge with the flat sides of other adjacent casings whether the casings be in the same row or in different rows. By thus arranging the casings 19 in wedging contact with each other, the flat sides 20 lend to their mutual lateral support and thereby prevent misalignment of the recording elements 16. Those casings 19 which line and wedge against the sides of the openings 12 receive their lateral support from the sides 13.

In the description set forth above, the recording elements 16 were described as being inserted in the casings 19 before the same were assembled in the openings 12. Although this was a necessary step in the prior art, it is no longer necessary or of any importance in my invention. The configuration of my novel guides 19 enable them to be assembled and wedged in aligned rows in the openings 12 without the recording elements 16 being first placed therein. The recording elements 16 may be inserted in their individual guide casings 19 from the underside after the casings have been assembled in openings 12. Any tendency upon the part of the casings 19 to move out of the opening 12 wil be checked and stopped by the wedged condition of the casings.

As described before, the openings 12 in the mounting head 10 can be varied in shape to mount a recording head 14 having any desired mosaic or information recording pattern. Any change in the shape of the opening 12 will merely necessitate a corresponding change in the configuration of the guides 19 either in the number of its flats 20 and/or in the placement of the flats 20 about the sides 13 of the openings 12.

The term "recording" as employed in the disclosure of my invention is to be interpreted as to include the functions of printing, marking, perforating, etc.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

The invention is claimed as follows:

1. A recording head structure comprising a mounting member having a rectangular opening therein, a plurality of character-forming recording elements arranged in aligned rows within said opening, and individual guide casings for said recording elements having reduced end portions of rectangular cross-sections configuration respectively contacting one another and the sides of said opening, said casings also having unreduced portions contacting one another outside of said opening for causing said end portions to be held in tightly wedged relationship by said mounting member.

2. In a recording machine of the type having a rectangular aray of recording elements selectively operable in various combinations to record different characters, a recording head structure for said recording elements comprising a mounting member having portions thereof which define the sides of said rectangular array, and individual guide casings for said recording elements extending into said mounting member, said guide casings having reduced end portions of rectangular cross-sectional configuration respectively contacting one another and said side portions and also having unreduced portions adapted to bear against one another for causing said end portions to be held in tightly wedged relationship by said mounting member.

References Cited in the file of this patent

UNITED STATES PATENTS

| | | |
|---|---|---|
| 756,832 | Cleveland | Apr. 12, 1904 |
| 830,193 | Andersson | Sept. 4, 1906 |
| 2,646,620 | Geddes et al. | July 28, 1953 |